United States Patent
Koshin et al.

(10) Patent No.: US 9,142,958 B2
(45) Date of Patent: *Sep. 22, 2015

(54) POWER SUPPLY APPARATUS

(75) Inventors: Hiroaki Koshin, Toyonaka (JP); Takuya Kagawa, Huko (JP)

(73) Assignee: Panasonic Corporation, Kadoma-shi (JP)

(*) Notice: Subject to any disclaimer, the term of this patent is extended or adjusted under 35 U.S.C. 154(b) by 525 days.

This patent is subject to a terminal disclaimer.

(21) Appl. No.: 13/380,647

(22) PCT Filed: Jun. 23, 2010

(86) PCT No.: PCT/JP2010/060683
§ 371 (c)(1),
(2), (4) Date: Jan. 3, 2012

(87) PCT Pub. No.: WO2010/150828
PCT Pub. Date: Dec. 29, 2010

(65) Prior Publication Data
US 2012/0091801 A1    Apr. 19, 2012

(30) Foreign Application Priority Data
Jun. 25, 2009 (JP) ................. 2009-151607

(51) Int. Cl.
*H02J 1/00* (2006.01)
*H02J 1/10* (2006.01)
(Continued)

(52) U.S. Cl.
CPC ... *H02J 1/10* (2013.01); *H02J 7/35* (2013.01); *H02J 1/102* (2013.01); *H02J 3/383* (2013.01); *H02J 3/387* (2013.01); *H02J 7/34* (2013.01); *Y02E 10/563* (2013.01); *Y10T 307/352* (2015.04)

(58) Field of Classification Search
CPC .................. H02J 7/35; H02J 1/10; H02J 7/14
USPC .......................................................... 307/24
See application file for complete search history.

(56) References Cited

U.S. PATENT DOCUMENTS

| 6,314,009 B1* | 11/2001 | Dittmer et al. ................... 363/65 |
| 2003/0197429 A1* | 10/2003 | Takehara et al. ................. 307/86 |

(Continued)

FOREIGN PATENT DOCUMENTS

| EP | 2 474 875 | 7/2012 |
| JP | 03-080316 A | 4/1991 |

(Continued)

OTHER PUBLICATIONS

International Search Report dated Sep. 7, 2010, issued for PCT/JP2010/060683.

(Continued)

*Primary Examiner* — Rexford Barnie
*Assistant Examiner* — Elim Ortiz
(74) *Attorney, Agent, or Firm* — Locke Lord LLP

(57) ABSTRACT

The power supply apparatus includes a first power device, a second power unit, and controlling means. Each of the first power device and the second power unit supplies DC power to a DC supply line. The first power device makes constant voltage control. The second power unit includes a second power device configured to make inclination control of monotonically decreasing its output voltage with an increase of its output current, and of monotonically increasing its output voltage with a decrease of its output current. Upon acknowledging that a measurement (a magnitude of a current flowing through the DC supply line) exceeds an optimal current magnitude (a magnitude of a current supplied to the DC supply line from the first power device operating at maximum conversion efficiency), the controlling means outputs an instruction such that a magnitude of a current supplied to the DC supply line from the second power unit is identical to a difference between the measurement and the optimal current magnitude. The second power device modifies a condition of the inclination control, thereby adjusting its output current to a current corresponding to the instruction without varying its output voltage.

4 Claims, 9 Drawing Sheets

(51) Int. Cl.
*H02J 7/35* (2006.01)
*H02J 7/34* (2006.01)
*H02J 3/38* (2006.01)

(56) References Cited

U.S. PATENT DOCUMENTS

| | | | |
|---|---|---|---|
| 2004/0066094 A1* | 4/2004 | Suzuki et al. | 307/18 |
| 2005/0073289 A1* | 4/2005 | Takada et al. | 323/282 |
| 2005/0231180 A1* | 10/2005 | Nagata et al. | 323/268 |
| 2006/0108988 A1* | 5/2006 | McKelvey et al. | 323/205 |
| 2007/0057658 A1* | 3/2007 | Hasegawa | 323/282 |
| 2008/0143188 A1* | 6/2008 | Adest et al. | 307/82 |
| 2009/0134109 A1* | 5/2009 | Shimoie | 212/347 |
| 2010/0327655 A1* | 12/2010 | Okamoto et al. | 307/24 |
| 2012/0161516 A1 | 6/2012 | Koshin et al. | |

FOREIGN PATENT DOCUMENTS

| | | |
|---|---|---|
| JP | 10-248253 A | 9/1998 |
| JP | 10-248253 A | 9/1998 |
| JP | 2005-224009 A | 8/2005 |
| JP | 2006-262549 A | 9/2006 |

OTHER PUBLICATIONS

Supplementary European Search Report filed on Oct. 14, 2014 in corresponding European Patent Application No. 10792146.2.

* cited by examiner

POWER SUPPLY APPARATUS

CROSS REFERENCE TO RELATED APPLICATIONS

This application is related to co-pending application: "POWER SUPPLY APPARATUS" filed even date herewith in the names of Hiroaki KOSHIN and Takuya KAGAWA as a national phase entry of PCT/JP2010/060684 filed on Jun. 23, 2010, which application is assigned to the assignee of the present application and is incorporated by reference herein.

TECHNICAL FIELD

The present invention relates to power supply apparatus configured to operate simultaneously multiple power devices to supply DC power therefrom to a load device connected thereto.

BACKGROUND ART

In the past, there have been proposed various power supply apparatus which simultaneously operates plurality of power devices to supply DC power from the power devices to one or more load devices connected to the power devices.

As an instance of the prior power supply apparatus, power supply apparatus including two power devices each configured to decrease monotonically its output voltage with an increase of its output current (see Japanese patent laid-open publication No. 10-248253). In this power supply apparatus, the two power devices shows individual output current-output voltage characteristics of which lines have different gradient from each other. This means that, when the two power devices varies their output current by the same extent, one of the power devices shows a variation of the output voltage different from that of the other power device.

In this power supply apparatus, each of the power devices operates to reach a balance point determined by its output current-output voltage characteristics and the load current in accordance with a magnitude of a total consumed current (load current) of all the load devices. Therefore, each of the power devices can output the desired output voltage and output current.

However, in this power supply apparatus where the two power devices shows individual output current-output voltage characteristics of which lines have different gradient from each other, the output voltages (that is, supply voltages for the load current) of each of the power device are varied due to a magnitude of the load current. Therefore, the power supply apparatus fails to output the stable supply voltage. In this power supply apparatus, in order to keep the supply voltage to the load device at a constant level irrespective of changes of the output currents of the each of the power devices, both of the power supply apparatus have to vary their output current-output voltage characteristics. For satisfying this requirement, the power supply apparatus needs to have a more complex configuration.

Now, in order to solve the above problem, there has been proposed power supply system including the power devices which are operated simultaneously. One of the power devices is configured to make constant voltage control, and the remaining is configured to make inclination control of outputting its output voltage of a DC voltage decreased with an increase of its output current. In this power supply apparatus, the power device performing the inclination control supplies a current to the load device while having its output voltage identical to an output voltage (reference voltage) of the power device performing the constant voltage control. In this situation, the power device performing the constant voltage current compensates for a shortage a current supplied to the load device. Therefore, according to the power supply apparatus, the supplied voltage for the load device is kept constant voltage (the output voltage of the power device performing the constant voltage control) irrespective of the variation of the load current. Consequently, this power supply apparatus can successfully supply power to the load device.

For example, a commercial power source is used as a power source connected to the above power device. The power device to be connected to the commercial power source includes a DC/DC converter. The DC/DC converter suffers from internal loss such as conduction loss (loss caused by an on-resistance of a switching element, a parasitic resistance of an inductor, or the like). As a result, a variation of conversion efficiency of the power device (a proportion of output power of the power device to input power of the power device) with an output current is expressed by a characteristics line having an output current maximizing the conversion efficiency, as shown in (a) of FIG. 9. With operating the power device connected to the commercial power source so as to supply an output current which is identical to a current supplied from the power device operating at the maximum conversion efficiency, it is possible to operate the power device efficiently.

However, in the prior power supply apparatus, each power device varies its output current depending on a magnitude of the load current. Therefore, the prior power supply apparatus is likely to operate inefficiently the power device connected to the commercial power.

DISCLOSURE OF INVENTION

In view of the above insufficiency, the present invention has been aimed to propose power supply apparatus capable of operating a power device to be connected to a commercial power source at maximum conversion efficiency.

The power supply apparatus in accordance with the present invention includes a first power device, a second power unit, load current measuring means, judging means, and controlling means. Each of the first power device and the second power unit is adapted to be connected to a DC supply line to be connected to a load device and is configured to supply DC power to the load device through the DC supply line. The load current measuring means is configured to measure a current flowing through the DC supply line and output a measurement indicative of a magnitude of the measured current. The judging means is configured to, upon obtaining the measurement from the load current measuring means, judge whether or not the obtained measurement exceeds an optimal current magnitude. The first power device is adapted to be connected to a commercial power source. The first power device is configured to convert power obtained from the commercial power source to the DC power so as to perform constant voltage control of supplying a constant voltage to the DC supply line irrespective of a current supplied therefrom to the DC supply line. The optimal current magnitude is defined as a magnitude of a current which is outputted to the DC supply line from the first power device operating maximum power-conversion efficiency thereof. The second power unit includes at least one of second power devices. The second power device is configured to perform inclination control of monotonically decreasing an output voltage supplied therefrom to the DC supply line with an increase of an output current supplied therefrom to the DC supply line, and of monotonically increasing the output voltage with a decrease of the output current. The controlling means is configured to, upon acknowledging that the judging means determines that the measurement exceeds the optimal current magnitude, send an instruction to the second power device such that a magnitude of a current supplied from the second power unit to the DC power line is identical to a difference between the measurement and the optimal current magnitude. The second power device includes adjusting means configured to adjust the output current on the basis of the instruction received from the controlling means. The adjusting means is configured to, upon receiving the instruction from the controlling means, modify the condition of the inclination control so as to adjust the output current to a current corresponding to the instruction without varying the output voltage.

In a preferred aspect, the controlling means is configured to, upon acknowledging that the judging means determines that the measurement does not exceed the optimal current magnitude, control the second power unit so as to terminate supplying the current to the DC supply line.

In a preferred aspect, the second power unit includes a plurality of the second power devices. The current supplied to the DC supply line from the second power unit is defined as the sum of the output currents respectively supplied from the second power devices.

BEST MODE FOR CARRYING OUT THE INVENTION

Figure 2:
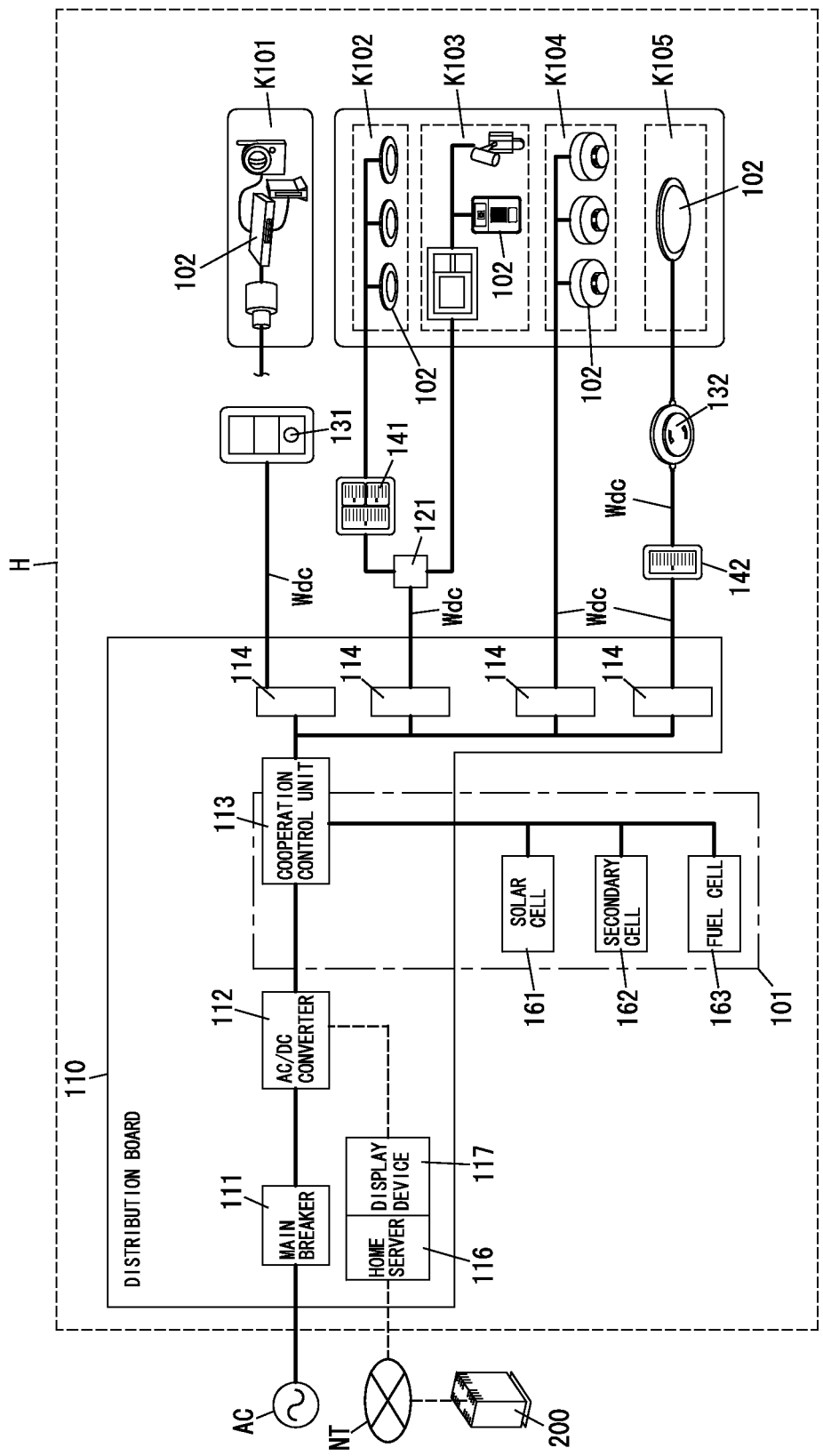
FIG. 2 is a configuration diagram illustrating the above power supply apparatus.

In the embodiment explained below, a house of a single-family dwelling is exemplified as a building where power supply apparatus 3 of the present invention is installed. The power supply apparatus 3 in accordance with the present invention may be installed in a housing complex. As shown in FIG. 2, there are a DC power supply unit 101 configured to supply DC power and DC devices (load devices) 102 placed in a house "H". Each DC device 102 is a load activated by DC power. The DC power supply unit 101 has an output terminal connected to the DC devices 102 via a DC supply line Wdc and supplies DC power from the output terminal to the DC devices via the DC supply line Wdc. There is a DC breaker 114 interposed between the DC power supply unit 101 and the DC device 102. The DC breaker 114 is configured to monitor a current flowing through the DC supply line Wdc. Upon detecting an abnormal state, the DC breaker 114 limits or terminates electrical power supply from the DC power supply unit 101 to the DC device 102 via the DC supply line Wdc.

The DC supply line Wdc is adopted as a power line for DC power as well as a communication line. For example, it is possible to communicate between devices connected to the DC supply line Wdc by means of superimposing on a DC voltage a communication signal used for transmitting data and made of a high-frequency carrier. This technique is similar to a power line communication technique where a communication signal is superimposed on an AC voltage applied to a power line for supplying an AC power.

The aforementioned DC supply line Wdc is connected to a home server 116 via the DC power supply unit 101. The home server 116 is a primary device for constructing a home communication network (hereinafter referred to as "home network"). The home server 116 is configured to communicate with a subsystem constructed by the DC devices 102 in the home network, for example.

In the illustrated instance, an information system K101, lighting systems K102 and K105, an entrance system K103, and a home alarm system K104 are adopted as the subsystem. The information system K101 includes the informational DC device 102 such as a personal computer, a wireless access point, a router, and an IP telephone transceiver. Each of the lighting systems K102 and K105 includes the lighting DC device 102 such as a lighting fixture. The entrance system K103 includes the DC device 102 configured to respond to a visitor and to monitor an intruder. The home alarm system K104 includes the alarming DC device 102 such as a fire alarm. The each subsystem is an autonomous distributed system, and operates by itself.

The aforementioned DC breaker 114 is associated with the subsystem. In the illustrated instance, the information system K101, a set of the lighting system K102 and the entrance system K103, the home alarm system K104, and the lighting system K105 are associated with the four single DC breakers 114, respectively. A connection box 121 is provided to associate the single DC breaker 114 with a plurality of the subsystems. The connection box 121 is configured to divide a system of the DC supply line for each subsystem. In the illustrated instance, the connection box 121 is interposed between the lighting system K102 and the entrance system K103.

The information system K101 includes the DC device 102 connected to a DC socket 131 preliminarily provided to the house "H" (provided at the time of constructing the house "H") as a wall outlet or a floor outlet, for example.

The lighting system K102 includes the lighting fixture (DC device 102) preliminarily provided to the house "H". Meanwhile, the lighting system K105 includes the lighting fixture (DC device 102) connected to a ceiling-mounted hooking receptacle 132 preliminarily provided on a ceiling. It is noted that the lighting fixture is attached to the ceiling-mounted hooking receptacle 132 by a contractor at the time of constructing an interior of the house "H" or attached to the ceiling-mounted hooking receptacle 132 by a resident of the house "H".

The lighting fixture of the lighting system K102 can receive a control instruction from an infrared remote controller. Further, the control instruction can be sent by use of a communication signal transmitting to the lighting fixture from a switch 141 connected to the DC supply line Wdc. The lighting fixture of the lighting system K105 can receive a control instruction from an infrared remote controller. Further, the control instruction can be sent by use of a communication signal transmitting to the lighting fixture from a switch 142 connected to the DC supply line Wdc. In short, each of the switches 141 and 142 has a function of communicating with the DC device 102. The control instruction may be given by the manipulation of each of the switches 141 and 142. In addition, the control instruction can be sent by use of a communication signal transmitted to the DC device 102 from the home server 116 or the other DC device 102 of the home network. The control instruction for the lighting fixture indicates such as turning on, turning off, dimming, and blinking.

Any DC device 102 can be connected to the DC outlet 131 or the ceiling-mounted hooking outlet 132. Each of the DC outlet 131 and the ceiling-mounted hooking receptacle 132 supplies DC power to the connected DC device 102. Therefore, the DC outlet 131 and the ceiling-mounted hooking receptacle 132 are hereinafter collectively referred to as "DC outlet", if a distinction between the DC outlet 131 and the ceiling-mounted hooking receptacle 132 is unnecessary.

The DC outlet has a case which is provided with a connection slot (plug-in connection slot) for inserting a terminal of the DC device 102. The case houses a terminal receiving member configured to directly contact to the terminal which is inserted into the case via the connection slot. In brief, the DC outlet with above mentioned configuration makes contact-type power supply. The DC device 102 with a communication function is capable of transmitting a communication signal via the DC supply line Wdc. The communication function is provided to the DC outlet in addition to the DC device 102.

The home server 116 is connected to the home network as well as the wide area network NT constructing the Internet. While the home server 116 is connected to the wide area network NT, a user can enjoy service provided by a center server (computer server) 200 connected to the wide area network NT.

The center server 200 provides a service of monitoring or controlling a device (which is mainly the DC device 102, but which may be other apparatus having a communication function) connected to the home network via the wide area network NT, for example. The service enables monitoring or controlling a device connected to the home network by use of a communication terminal (not shown) having a browsing function such as a personal computer, an internet TV, and a mobile telephone equipment.

The home server 116 has a function of communicating with the center server 200 connected to the wide area network NT and a function of communicating with a device connected to the home network. The home server 116 further has a function of collecting identification information (e.g. IP address) concerning a device connected to the home network.

The home server 116 utilizes the function of communicating with the center server 200, thereby enabling the communication terminal connected to the wide area network NT to monitor and control the home device via the center server 200. The center server 200 mediates a communication between the home device and the communication terminal on the wide area network NT.

When a user attempts to monitor or control the home device by use of the communication terminal, the user controls the communication terminal so as to store a monitoring request or a control request in the center server 200. The device placed in the house establishes periodically one-way polling communication, thereby receiving the monitoring request or control request from the communication terminal. According to the aforementioned operation, it is possible to monitor or control the device placed in the house by use of the communication terminal.

When an event (such as fire detection) of which the home device should notify the communication terminal occurs, the home device notifies the center server 200 of occurrence of the event. When the center server 200 is notified of the occurrence of the event by the home device, the center server 200 notifies the communication terminal of the occurrence of the event by use of an e-mail.

A function of communicating with the home network of the home server 116 includes an important function of detecting and managing a device constructing the home network. By means of utilizing UPnP (Universal Plug and Play), the home server 116 automatically detects a device connected to the home network. The home server 116 further includes a display device 117 having a browsing function, and controls the display device 117 to display a list of the detected device. The display device 117 includes a touch panel or another user interface unit. Therefore, it is possible to select a desired one from options displayed on a screen of the display device 117. Accordingly, a user (a contractor or a resident) of the home server 116 can monitor and control the device through the screen of the display device 117. The display device 117 may be separated from the home server 116.

The home server 116 manages information with relation to connection of devices. For example, the home server 116 stores a type or a function and an address of the device connected to the home network. Therefore, it is possible to make a linked operation between devices of the home network. As described in the above, the information with relation to connection of a device is automatically detected. In order to make the linked operation between the devices, it is sufficient that an association between devices is automatically made by an attribution of a device. An information terminal such as a personal computer may be connected to the home server 116. In this instance, the association between devices can be made by use of a browsing function of the information terminal.

Each of the devices holds a relation with regard to the linked operations between the devices. Therefore, the devices can make the linked operation without requiring to access to the home server 116. After establishing an association with regard to the linked operation of respective devices, a lighting fixture, which is one of the devices, is caused to turn on and off by manipulation of a switch, which is another of the devices, for example. Although the association with regard to the linked operation is made for the devices belonging to the same subsystem, the association with regard to the linked operation may be made for the devices belonging to the different subsystems.

Basically, the DC supply unit 101 is configured to generate DC power from AC power supplied from a commercial power source AC located outside. In the illustrated configuration, the commercial power source AC is connected to an AC/DC converter 112 including a switching regulator via a main breaker 111. The main breaker 111 is embedded in a distribution board 110. DC power outputted from the AC/DC converter 112 is supplied to each DC breaker 114 via a cooperation control unit 113.

The DC supply unit 101 is provided with a secondary cell 162 in view of a period (an outage of the commercial power source AC) in which the DC supply unit 101 fails to receive electrical power from the commercial power source AC. For example, the secondary cell 162 may be a lithium ion secondary battery. In the DC supply unit 101, a solar cell 161 and a fuel cell 163 configured to generate DC power can be used together with the secondary cell 162. Each of the solar cell 161, the secondary cell 162, and the fuel cell 163 acts as a dispersed power source in view of a main power source including the AC/DC converter 112 configured to create DC power from AC power supplied from the commercial power source AC. Besides, the secondary cell 162 includes a charge controlling circuit (not shown).

The secondary cell 162 is charged by at least one of the commercial power source AC, the solar cell 161, and the fuel cell 163 at a proper timing. The secondary cell 162 is discharged during a period in which the DC supply unit 101 fails to receive electrical power from the commercial power source AC. In addition, the secondary cell 162 is discharged at appropriate timing as necessary. The cooperation control unit 113 is configured to control discharge and charge of the secondary cell 162 and to make cooperation between the main power source and the dispersed power sources. In brief, the cooperation control unit 113 functions as a DC power control unit configured to control distributing to the DC device 102 electrical power from the main power source and dispersed power source constituting the DC supply unit 101.

A drive voltage of the DC device 102 is selected from different voltages respectively suitable to individual devices of different voltage requirements. For this purpose, the cooperation control unit 113 is preferred to include a DC/DC converter configured to convert DC voltage from the main power source and dispersed power sources into a desired voltage. Normally, a fixed voltage is applied to one subsystem (or the DC device 102 connected to one particular DC breaker 114). However, different voltages may be selectively applied to one subsystem by use of three or more lines. Use of two wired DC supply line Wdc can vary the voltage applied between wires with time. The DC/DC converter can be placed at plural points in a similar fashion as the DC breakers.

In the aforementioned configuration instance, only one AC/DC converter 112 is provided. However, a plurality of the AC/DC converters 112 may be connected in parallel to each other. When the plurality of the AC/DC converters 112 is provided, it is preferred to vary the number of the AC/DC converters 112 being activated in accordance with an amount of power required by loads.

Each of the AC/DC converter 112, the cooperation control unit 113, the DC breaker 114, the solar cell 161, the secondary cell 162, and the fuel cell 163 is provided with a communication function. Therefore, the linked operation can be performed in response to status of each of the main power source, dispersed power sources, and loads including the DC device 102. Like a communication signal used for the DC device 102, a communication signal used by the communication function is transmitted by being superimposed on DC voltage.

In the aforementioned instance, in order to convert AC power outputted from the main breaker 111 to DC power, the AC/DC converter 112 is placed in the distribution panel 110. However, the AC/DC converter 112 is not necessarily placed in the distribution panel 110. For example, branch breakers (not shown) may be connected to an output side of the main breaker 111 in the distribution panel 110 such that a plurality of systems is branched off from an AC supply line, and an AC/DC converter may be provided to an AC supply line of each of the systems. That is, each system may be provided with an apparatus configured to convert AC power into DC power.

In this arrangement, it is possible to provide the DC supply unit 101 to each unit such as a floor or room of the house "H". Accordingly, it is possible to manage the DC supply unit 101 for each system. In addition, it is possible to shorten a distance between the DC supply unit 101 and the DC device 102 configured to utilize DC power. Therefore, it is possible to reduce power loss caused by a voltage drop which occurs in the DC supply line Wdc. Alternatively, the main breaker 111 and branch breaker may be housed in the distribution panel 110, and the AC/DC converter 112, the cooperative control unit 113, the DC breaker 114, and the home server 116 may be placed in another panel different from the distribution panel 110.

Figure 1:
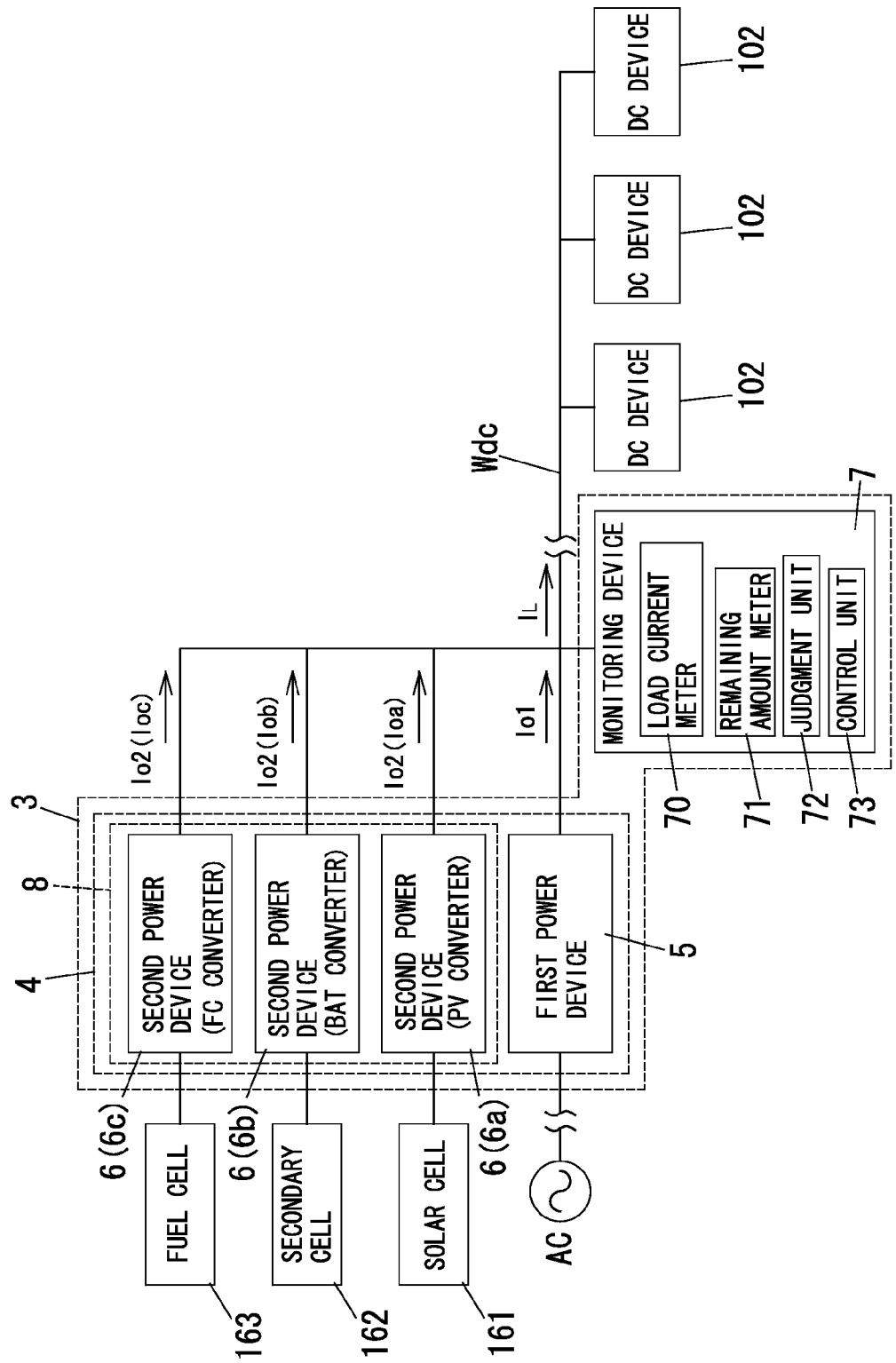
FIG. 1 is a block diagram illustrating a primary part of power supply apparatus of one embodiment of the present invention.

Next, an explanation referring to FIG. 1 is made to the power supply apparatus 3 housed in the DC power supply unit 101. The power supply apparatus 3 includes a plural (in the illustrated instance, four) power devices 4 (5, 6) and a monitoring device 7. The power devices 4 (5, 6) are configured to operate simultaneously to supply a DC power to the DC device (load device) 102. The monitoring device 7 is configured to monitor a whole system regarding the DC power supply.

The plural power devices 4 include a single first power device 5 and plural (in the illustrated instance, three) second power devices 6 (6a to 6c).

The plural second power devices 6 (6a to 6c) constitute a second power unit 8. In the present embodiment, the second power unit 8 includes the three second power devices 6a, 6b, and 6c. Therefore, a current supplied from the second power unit 8 to the DC supply line Wdc is defined as the sum (=Ioa+Iob+Ioc) of the output currents Io2 respectively supplied from the three second power devices 6.

In the present embodiment, the second power unit 8 includes the three second power devices 6. By contrast, the second power unit 8 may include the single second power device 6. In this arrangement, the current supplied from the second power unit 8 to the DC supply line Wdc is identical to the output current Io2 of the single second power device 6. Alternatively, the second power unit 8 may include the two second power devices 6, or may include the four or more second power devices 6.

Figure 5:
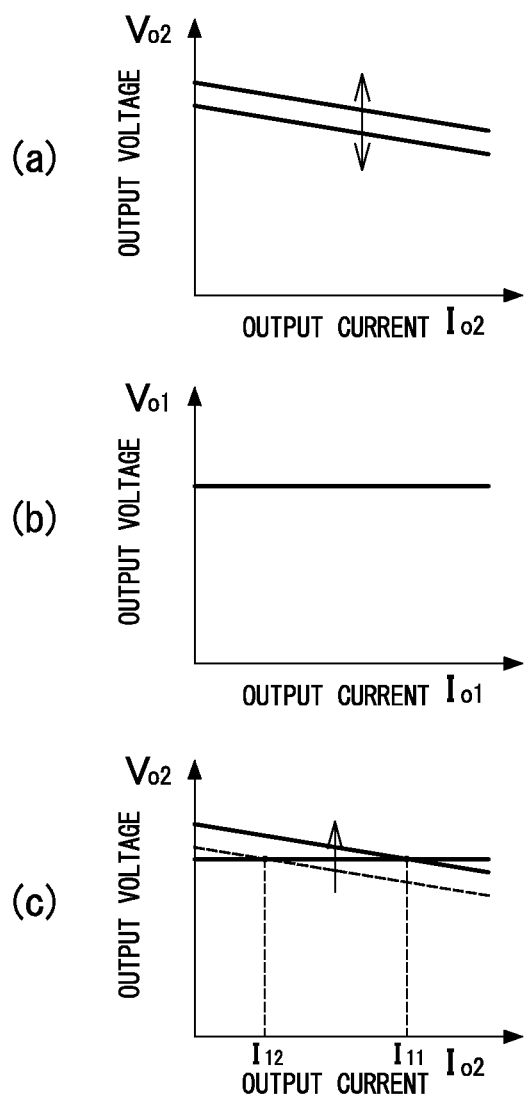
FIG. 5 shows a diagram (a) illustrating output current-output voltage characteristics of the second power device of the above power supply apparatus, a diagram (b) illustrating output current-output voltage characteristics of the first power device of the above power supply apparatus, and an explanatory view (c) illustrating an output current of the second power device of the above power supply apparatus.

The first power device 5 is configured to provide the output voltage Vo1 of a DC voltage which is a constant voltage irrespective of a magnitude of the output current Io1 (see (b) in FIG. 5). The first power device 5 receives a voltage supplied from the commercial power source AC as the input voltage Vi1 (see FIG. 3). That is, the first power source 5 is defined as a commercial power source dedicated power device configured to supply DC power to the DC device 102 on the basis of the voltage supplied from the commercial power source AC.

In brief, the first power device 5 is adapted to be connected to the commercial power source AC. The first power device 5 is configured to convert power obtained from the commercial power source AC to DC power so as to perform constant voltage control of supplying a constant voltage (output voltage Vo1) to the DC supply line Wdc irrespective of a current (output current Io1) supplied therefrom to the DC supply line Wdc.

In the present embodiment, as shown in FIG. 2, the first power device 5 is connected to the commercial power source AC via the AC/DC converter 112. That is, the AC/DC converter 112 converts the AC voltage from the commercial power source AC to a predetermined DC voltage, and provides the resultant DC voltage to the first power device 5. Thus, the input voltage Vi1 is the DC voltage outputted from the AC/DC converter 112. Alternatively, the input voltage Vi1 may be an AC voltage supplied from the commercial power source AC. In this arrangement, the first power device 5 is provided with an AC/DC converter configured to convert the input voltage Vi1 of the AC voltage to a DC voltage and supply the resultant DC voltage to the DC/DC converter 52.

Figure 3:
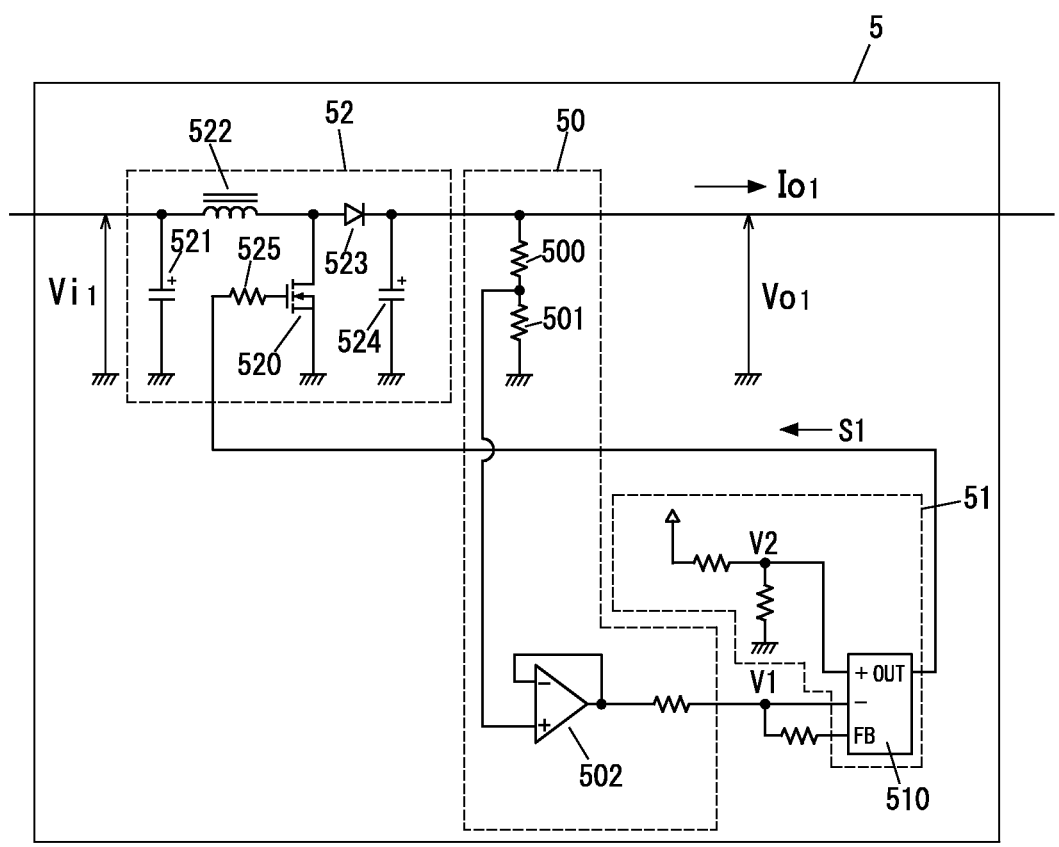
FIG. 3 is a circuit diagram illustrating a first power device of the above power supply apparatus.

As shown in FIG. 3, the first power device 5 includes a voltage meter 50, a switching controller 51, and the DC/DC converter 52. The voltage meter 50 is configured to measure the output voltage Vo1. The switching controller 51 is configured to generate a pulse width modulation signal S1 which has its duty ratio selected based on a reference voltage V2 and a detection voltage V1 of the voltage meter 50. The DC/DC converter 52 includes a switching device 520. The switching device 520 is configured to be turned on and off in accordance with the duty ratio of the pulse width modulation signal S1 outputted from the switching controller 51.

The voltage meter 50 includes two resistors 500 and 501 connected in series and a voltage follower 502 configured to receive a divided voltage generated by the resistors 500 and 501, thereby measuring the output voltage Vo1 of the first power device 5. The voltage meter 50 is configured to measure the output voltage Vo1 and provide the detection voltage V1 corresponding to the measured output voltage Vo1 to the switching controller 51.

The switching controller 51 includes a switching IC 510 configured to receive the detection voltage (an output voltage of the voltage follower 502) V1 of the voltage meter 50 as well as the reference voltage V2.

The switching IC 510 is configured to output to the switching device 520 the pulse width modulation signal S1 which has its duty ratio selected such that a difference voltage (=V2−V1) between the detection voltage V1 and the reference voltage V2 is kept constant. That is, the switching IC 510 is configured to select the duty ratio of the pulse width modulation signal S1 such that the output voltage Vo1 (the detection voltage V1) is kept constant.

The DC-DC converter 52 includes a smoothing capacitor 521, an inductor 522, the switching device 520, a diode 523, and a smoothing capacitor 524 which are arranged in this order from its input side. The DC-DC converter 52 operates to turn on and off the switching device 520 for increasing the input voltage Vi1.

For example, the switching device 520 is a field-effect transistor. The switching device 520 has its gate receiving the pulse width modulation signal S1 from the switching IC 510 via a resistor 525. Therefore, the switching device 520 is turned on and off in accordance with the duty ratio of the pulse width modulation signal S1 from the switching controller 51. While the switching device 520 is turned on, the switching device 520 has its source electrically connected to its drain. Thereby, the inductor 522 continues to accumulate electromagnetic energy. Thereafter, when the switching device 520 is turned off, the inductor 522 discharges the accumulated electromagnetic energy. Thereby, the input voltage Vi1 is increased. The increased input voltage Vi1 is smoothed by the smoothing capacitor 524 and is supplied to the DC device 102 (see FIG. 1) as the output voltage Vo1.

According to the aforementioned operation, the first power device 5 can make a feedback control to have the output current-output voltage characteristics of keeping the output voltage Vo1 constant irrespective of the magnitude of the output current Io1, as shown in (b) of FIG. 5.

The second power device 6 is configured to provide its output voltage Vo2 (a voltage supplied to the DC supply line Wdc) decreasing monotonically as its output current Io2 (a current supplied to the DC supply line Wdc) increases, as shown in (a) of FIG. 5. A line indicative of output current-output voltage characteristics of the second power device 6 can be expressed as a relation of $Vo2=-\alpha*Io2+V0 (\alpha>0, V0>0)$. In this relation, V0 is constant, and satisfies a relation $V0=Vo2+\alpha*Io2$. It is noted that "α" may be different in each of the second power devices 6 and may be common to the second power devices 6.

In other words, the second power device 6 is configured to perform inclination control of monotonically decreasing the output voltage Vo2 supplied to the DC supply line Wdc with an increase of the output current Io2 supplied therefrom to the DC supply line Wdc, and of monotonically increasing the output voltage Vo2 with a decrease of the output current Io2.

As shown in FIG. 1, the second power devices 6a, 6b, and 6c are connected to the solar cell 161, the secondary cell 162, and the fuel cell 163, respectively. The second devices 6 receive output voltages from the corresponding cells 161 to 163 as their input voltages Vi2 (see FIG. 4), respectively. In other words, the second power device 6a is defined as a solar cell dedicated power device (PV converter) configured to supply DC power to the DC device 102 based on the supplied voltage from the solar cell 161. The second power device 6b is defined as a secondary cell dedicated power device (BAT converter) configured to supply DC power to the DC device 102 based on the supplied voltage from the secondary cell 162. The second power device 6c is defined as a fuel cell dedicated power device (FC converter) configured to supply DC power to the DC device 102 based on the supplied voltage from the fuel cell 163. With regard to the first power device 5, the second power devices 6 are treated as the other power devices.

Figure 4:
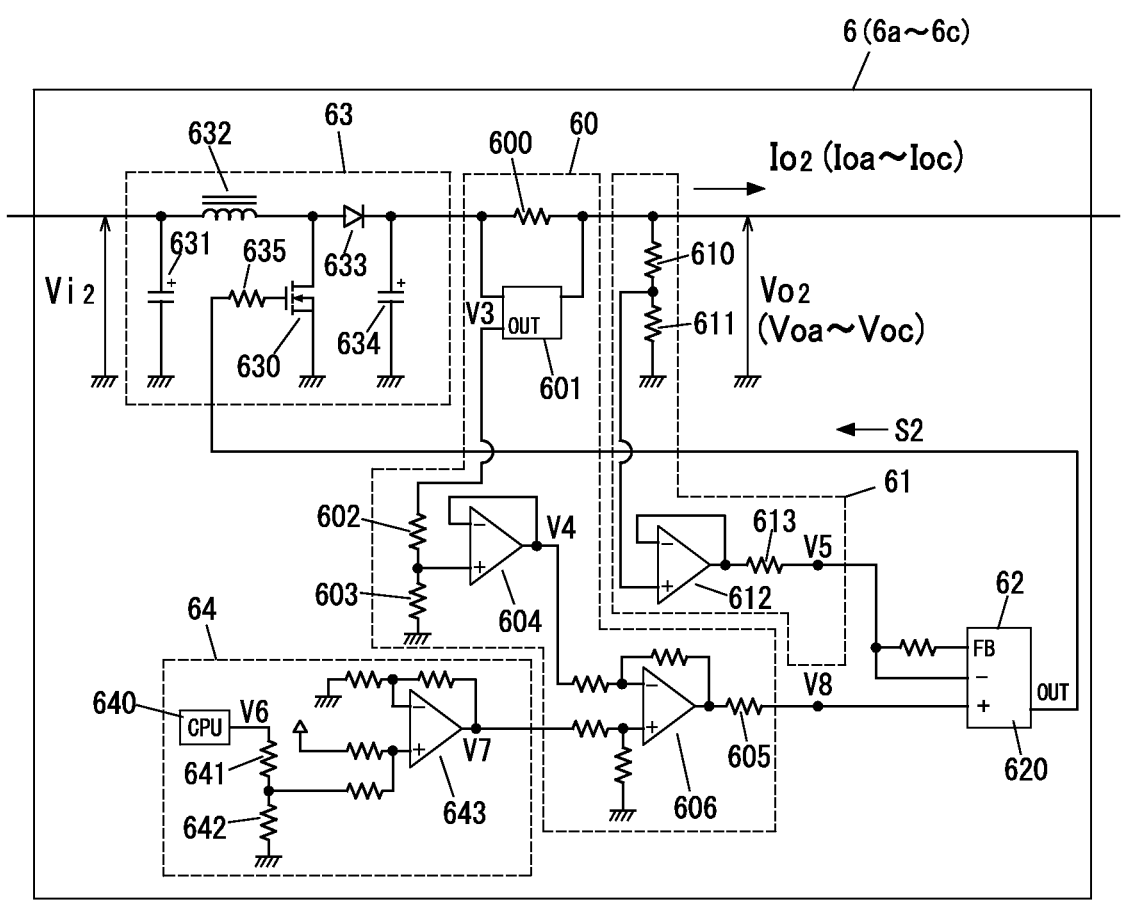
FIG. 4 is a circuit diagram illustrating a second power device of the above power supply apparatus.

As shown in FIG. 4, each second power device 6 includes a current meter 60, a voltage meter 61, a switching controller 62, a DC-DC converter 63, and adjustment means 64. The current meter 60 is configured to measure the output current Io2. The voltage meter 61 is configured to measure the output voltage Vo2. The switching controller 62 is configured to generate a pulse width modulation signal S2 which has its duty ratio selected on the basis of a detection voltage V5 of the voltage meter 61 and a voltage V8 outputted from the current meter 60. The DC/DC converter 63 includes a switching device 630. The switching device 630 is configured to be turned on and off in accordance with the duty ratio of the pulse width modulation signal S2 outputted from the switching controller 62. The adjusting means 64 is configured to adjust the output current Io2 in accordance with an instruction from a control unit 73 (see FIG. 1) as explained below.

The current meter 60 includes resistors 600 and "605", a current IC 601 configured to measure a voltage across the resistor 600, resistors 602 and 603 for dividing an output voltage V3 of the current IC 601, and a voltage follower 604 configured to receive a divided voltage generated by the resistors 602 and 603. Thus, the current meter 60 is configured to measure the output current Io2.

The voltage meter 61 includes two resistors 610 and 611 connected in series and a voltage follower 612 configured to receive a divided voltage generated by the resistors 610 and 611. The voltage meter 61 is configured to supply the detection voltage V5 corresponding to the measured output voltage Vo2 to the switching controller 62.

The switching controller 62 includes a switching IC 620 configured to receive the detection voltage (output voltage of the voltage follower 612) V5 of the voltage meter 61 and the after-mentioned voltage V8.

The DC-DC converter 63 includes a smoothing capacitor 631, an inductor 632, the switching device 630, a diode 633, and a smoothing capacitor 634 which are arranged in this order from its input side. The DC-DC converter 63 operates to turn on and off the switching device 620 for increasing the input voltage V12.

The adjusting means 64 includes a CPU 640, two resistors 641 and 642 for dividing an output voltage V6 of the CPU 640, and a non-inverting amplifier circuit 643. The CPU 640 is configured to receive the instruction prescribing the magnitude of the output current Io2 from the after-mentioned control unit 73 (see FIG. 1). The non-inverting amplifier circuit 643 is configured to receive a divided voltage generated by the resistors 641 and 642.

The CPU 640 is configured to vary the magnitude of the output current Io2 on the basis of the instruction received from the control unit 73 while the power supply apparatus 3 is in operation (the power supply apparatus 3 supplies power to the DC device 102).

As shown in FIG. 1, the monitoring device 7 includes a load current meter (load current detecting means) 70, a remaining amount meter 71, a judgment unit 72, the control unit (controlling means) 73. The load current meter 70 is configured to measure a load current $I_L$ supplied to the DC device 102. The remaining amount meter 71 is configured to determine an available power range of each of the solar cell 161 and the fuel cell 163. Further, the remaining amount meter 71 is configured to measure a remaining amount of power in the secondary cell 162. The judgment unit 72 is configured to judge whether or not the magnitude of the load current $I_L$ measured by the load current meter 70 exceeds an after-mentioned optimal current magnitude Im. The control unit 73 is configured to control the magnitude of the output current Io2 of each second power device 6.

The load current meter 70 is configured to measure the load current $I_L$. The load current $I_L$ is defined as a total consumption current of the DC devices 102. For example, the load current meter 70 is configured to measure a consumption current of each DC device 102 at a predetermined time interval while the power supply apparatus 3 is in operation (the power supply apparatus 3 supplies power to the DC device 102). Further, the load current meter 70 is configured to determine the load current $I_L$ by calculating the sum of the measured consumption currents. The predetermined time interval may be a time interval (e.g., a few milliseconds) enough to enable a load-following operation. Thus, the load current meter 70 is configured to measure a magnitude (current value) I0 of a current (load current $I_L$) flowing through the DC supply line Wdc and output a measurement indicative of the measured magnitude.

The remaining amount meter 71 measures an output voltage and an output current of the secondary cell 162 at the above time interval while the power supply apparatus 3 is in operation (the power supply apparatus 3 supplies power to the DC device 102). Further, the remaining amount meter 71 calculates the remaining amount of the power stored in the secondary cell 162 on the basis of a detection result (measurements of the output current and the output voltage).

The judgment unit 72 is configured to, upon receiving the measurement from the load current meter 70, judge whether or not the received measurement exceeds the optimal current magnitude Im.

As described in the above, the judgment unit 72 judges whether or not the load current $I_L$ has the magnitude greater than the optimal current magnitude Im. In addition, the judgment unit 72 refers to the remaining amount of the power in the secondary cell 162 obtained by the remaining amount meter 71, and judges whether or not the secondary cell 162 stores enough power enabling the second power device (BAT converter) 6b connected to the secondary cell 162 to supply the output current Io2 (Iob). For example, upon acknowledging that the remaining amount of the secondary cell 162 is equal to or more than a predetermined threshold, the judgment unit 72 judges that the power left in the secondary cell 162 is enough to enable the BAT converter 6b to supply the output current Iob. By contrast, upon acknowledging that the remaining amount of the secondary cell 162 is less than the predetermined threshold, the judgment unit 72 judges that the power left in the secondary cell 162 is not enough to enable the BAT converter 6b to supply the output current Iob.

The control unit 73 is configured to decide an amount of power to be supplied from each of the power devices (5, 6) to the DC devices 102 with regard to a whole system, and adjusts an output of each power device (5, 6) in response to the decided amount. The control unit 73 transmits the instruction prescribing the magnitude of the output current Io2, to the adjusting means 64 of each second power device 6. Here, the instruction may be a numerical amount directly defining the magnitude of the output current Io2. Alternatively, the instruction may be a numerical amount defining a magnitude of a voltage converted from the magnitude of the output current Io2. Besides, the instruction is not limited to a numerical amount defining the magnitude of the output current Io2 of the second power device 6. The instruction may be a numerical amount defining output power of the second power device 6.

The CPU 640 shown in FIG. 4 is configured to output the output voltage V6 having a magnitude corresponding to the instruction received from the control unit 73 (see FIG. 1). The non-inverting amplifier circuit 643 is configured to increase its output voltage V7 with an increase of the output voltage V6 of the CPU 640 and to decrease its output voltage V7 with a decrease of the output voltage V6 of the CPU 640.

The current detector 60 has a differential amplifier circuit 606 interposed between the voltage follower 604 and the resistor 605. The differential amplifier circuit 606 is configured to supply, to the switching IC 620, the voltage V8 ($=\beta^*(V7-V4)$ ($\beta>0$)) which is proportional to a difference voltage ($=V7-V4$) between the output voltage V7 of the non-inverting amplifier circuit 643 and the detection voltage V4 (the output voltage of the voltage follower 604) of the current meter 60. Even if the detection voltage V4 is not changed, the voltage V8 is increased as the output voltage V6 and the output voltage V7 are increased in accordance with the instruction from the control unit 73. By contrast, the voltage V8 supplied to the switching IC 620 is decreased as the output voltage V6 and the output voltage V7 are decreased. It is noted that "β" is selected such that the switching IC 620 can make a calculation of the voltage V8 and the detection voltage V5.

The switching IC 620 is configured to output the pulse width modulation signal S2 to the switching device 630. The duty ratio of the pulse width modulation signal S2 is selected (varied) such that a difference voltage ($=V8-V5$) between the voltage V8 and the detection voltage V5 (i.e., a voltage ($=\beta^*V7-(V5+\beta^*V4)$)) is kept constant. For instance, when the voltage ($=\beta^*V7-(V5+\beta^*V4)$) is increased from a preceding one, the switching IC 620 increases the duty ratio of the pulse width modulation signal S2 to reduce the voltage ($=\beta^*V7-(V5+\beta^*V4)$) (to the preceding one). By contrast, when the voltage ($=\beta^*V7-(V5+\beta^*V4)$) is decreased from a preceding one, the switching IC 620 decreases the duty ratio of the pulse width modulation signal S2 to increase the voltage ($=\beta^*V7-(V5+\beta^*V4)$) (to the preceding one).

For example, the switching device 630 is a field-effect transistor. The switching device 630 has its gate receiving the pulse width modulation signal S2 from the switching IC 620 via a resistor 635. While the switching device 630 is turned on, the switching device 630 has its source electrically connected to its drain. Thereby, the inductor 632 continues to accumulate electromagnetic energy. Thereafter, when the switching device 630 is turned off, the inductor 632 discharges the accumulated electromagnetic energy. Thereby, the input voltage V12 is increased. The raised input voltage V12 is smoothed by the smoothing capacitor 634 and is outputted to the DC device 102 (see FIG. 1) as the output voltage Vo2.

When the output current Io2 (the detection voltage V4) is increased, the voltage ($=\beta*V7-(V5+\beta*V4)$) is decreased from a preceding one. In response, the switching IC 620 decreases the duty ratio of the pulse width modulation signal S2 to increase the voltage ($=B*V7-(V5+\beta*V4)$) to the preceding one. As a result, the output voltage Vo2 (the detection voltage V5) is decreased. When the output current Io2 (the detection voltage V4) is decreased, the voltage ($=\beta*V7-(V5+\beta*V4)$) is increased from a preceding one. In response, the switching IC 620 increases the duty ratio of the pulse width modulation signal S2 to reduce the voltage ($=\beta*V7-(V5+\beta*V4)$) to the preceding one. As a result, the output voltage Vo2 (the detection voltage V5) is increased.

As shown in (a) of FIG. 5, the second power device 6 makes a feedback control to keep the voltage ($=\beta*V7-(V5+\beta*V4)$) constant, thereby having the output current-output voltage characteristics (a characteristics of keeping Vo2+$\alpha$*Io2 constant) of decreasing monotonically (linearly) the output voltage Vo2 with an increase of the output current Io2.

The line indicative of the output current-output voltage characteristics of the second power device 6 has an intersection point with a line indicative of the output current-output voltage characteristics of the first power device 5. Therefore, when the second power device 6 is used in combination with the first power device 5, the output voltage Vo2 is coordinated with the output voltage Vo1 of the first power device 5. Consequently, the output current Io2 has its magnitude corresponding to the output voltage Vo2 which has the same magnitude as the output voltage Vo1.

Figure 6:
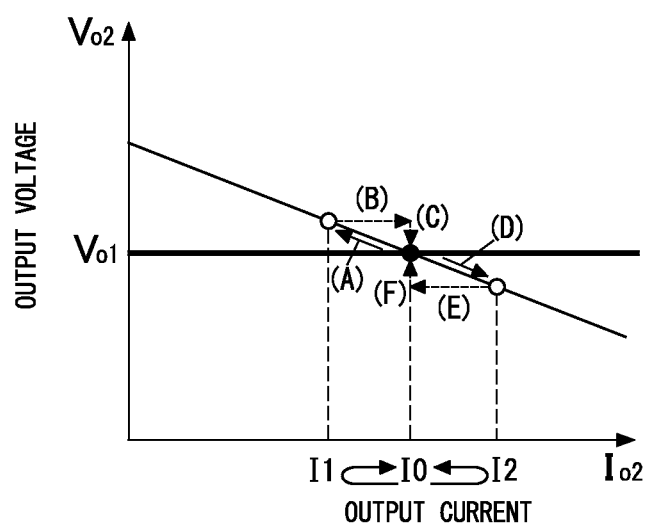
FIG. 6 is an explanatory view illustrating an operation of the second power device of the above power supply apparatus.

When the output current Io2 decreases, the output voltage Vo2 varies depending on the output current-output voltage characteristics shown in FIG. 6, thereby temporarily increasing (see (A) in FIG. 6). As seen from the above, the output current Io2 is increased with an increase of the output voltage Vo2. As a result, the detection voltage V4 also increases (see (B) in FIG. 6). The duty ratio of the pulse width modulation signal S2 decreases because the voltage ($=\beta*V7-(V5+\beta*V4)$) decreases with an increase of the detection voltage V4. Consequently, the output voltage Vo2 (the detection voltage V5) decreases (see (C) in FIG. 6). Thus, the output voltage Vo2 becomes identical to the output voltage Vo1.

When the output current Io2 increases, the output voltage Vo2 varies depending on the output current-output voltage characteristics shown in FIG. 6, thereby temporarily decreasing (see (D) in FIG. 6). As seen from the above, when the output voltage Vo2 decreases, the output current Io2 decreases. As a result, the detection voltage V4 also decreases (see (E) in FIG. 6). The duty ratio of the pulse width modulation signal S2 increases because the voltage ($=\beta*V7-(V5+\beta*V4)$) increases with a decrease of the detection voltage V4. Consequently, the output voltage Vo2 (the detection voltage V5) increases (see (F) in FIG. 6). Thus, the output voltage Vo2 becomes identical to the output voltage Vo1.

Figure 7:
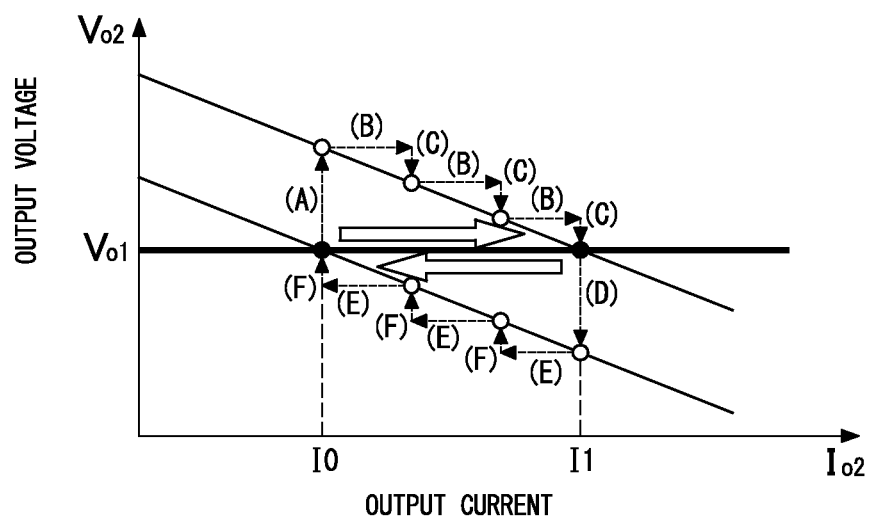
FIG. 7 is an explanatory view illustrating a variation of the output current-output voltage characteristics of the second power device of the above power supply apparatus.

Next, an explanation referring to FIG. 7 is made to an instance where the second power device 6 receives the instruction from the control unit 73. For example, when the total consumption current (load current $I_L$) of the DC devices 102 increases, the control unit 73 provides to the second power device 6 the instruction so as to increase the output current Io2 yet keep the output voltage Vo2 (the detection voltage V5) constant. In response to the instruction, the output voltage V7 and the voltage V8 ($=\beta*V7-V4$)) are increased. Consequently, since the voltage ($=\beta*V7-(V5+\beta*V4)$) is increased, the duty ratio of the pulse width modulation signal S2 is increased. As a result, the output voltage Vo2 temporarily exceeds the output voltage Vo1 (see (A) in FIG. 7). This operation means adding a predetermined voltage to the output voltage Vo2 of the second power device 6. When the output voltage Vo2 is increased by the addition of the predetermined voltage, the output current Io2 (the detection voltage V4) is also increased (see (B) in FIG. 7). Since the voltage ($=\beta*V7-(V5+\beta*V4)$) decreases with an increase of the detection voltage V4, the duty ratio of the pulse width modulation signal S2 is decreased. Consequently, the output voltage Vo2 is lowered (see (C) in FIG. 7). The second power device 6 repeats this operation. Thereby, the output voltage Vo2 becomes identical to the output voltage Vo1 in due course. As a result, the line indicative of the output current-output voltage characteristics of the second power device 6 is shifted in order to obtain the output current Io2 at intersections with the line indicative of constant voltage characteristics (the output current-output voltage characteristics of the first power device 5), thus obtained output current reaching the output current Io2 corresponding to the instruction (the current magnitude I1).

For example, when the load current $I_L$ decreases, the control unit 73 provides to the second power device 6 the instruction so as to decrease the output current Io2 yet keep the output voltage Vo2 (the detection voltage V5) constant. In response to the instruction, the output voltage V7 and the voltage V8 ($=\beta*V7-V4$)) are decreased. Consequently, since the voltage ($=\beta*V7-(V5+\beta*V4)$) is decreased, the duty ratio of the pulse width modulation signal S2 is decreased. As a result, the output voltage Vo2 temporarily falls below the output voltage Vo1 (see (D) in FIG. 7). This operation means subtracting a predetermined voltage from the output voltage Vo2 of the second power device 6. When the output voltage Vo2 is decreased by the subtraction of the predetermined voltage, the output current Io2 (the detection voltage V4) is also decreased (see (E) in FIG. 7). Since the voltage ($=\beta*V7-(V5+\beta*V4)$) increases with a decrease of the detection voltage V4, the duty ratio of the pulse width modulation signal S2 is increased. Consequently, the output voltage Vo2 is raised (see (F) in FIG. 7). The second power device 6 repeats this operation. Thereby, the output voltage Vo2 becomes identical to the output voltage Vo1 in due course. As a result, the line indicative of the output current-output voltage characteristics of the second power device 6 is shifted in order to obtain the output current Io2 at intersections with the line indicative of constant voltage characteristics (the output current-output voltage characteristics of the first power device 5), thus obtained output current reaching the output current Io2 corresponding to the instruction (the current magnitude I0).

As seen from the above, the adjustment means 64 is configured to, upon receiving the instruction from the control unit (controlling means) 73, modify a condition of the inclination control so as to adjust the output current Io2 to a current corresponding to the instruction without varying the output voltage Vo2. The adjusting means 64 varies the condition of the inclination control so as to shift the line indicative of the output current-output voltage characteristics. In other words, the adjusting means 64 makes a translational movement of the line indicative of the output current-output voltage characteristics.

Irrespective of shifting the output current-output voltage characteristics of the second power device 6, the output voltage Vo2 is coordinated with the output voltage Vo1 of the first power device 5. Therefore, the output current Io2 has its magnitude corresponding to the output voltage Vo2 which has the same magnitude as the output voltage Vo1.

According to the aforementioned configuration, each second device 6 is enabled to shift its output current-output voltage characteristics on the basis of the instruction received from the control unit 73, as shown in FIG. 7. Even after the output current-output voltage characteristics are shifted, the second power device 6 provides its output voltage Vo2 identical to the output voltage Vo1 of the first power device 5. Therefore, the output current Io2 which is outputted from the second device 6 when the output voltage Vo2 has the same magnitude as the output voltage Vo1 can be provided to the DC device 102. Consequently, even if the load current $I_L$ is varied, the power supply apparatus 3 can select the magnitude of the output current Io2 for each second power device 6 in match with the load current $I_L$. In addition, the output voltage Vo2 can be kept constant because the second power device 6 has its output voltage Vo2 kept identical to the output voltage Vo1 of the first power device 5 even if the load current $I_L$ changes its magnitude. Therefore, it is possible to make stable power supply for the DC device 102.

The following explanation is made to an instance. In FIG. 5, (a) shows the output current-output voltage characteristics of the second power device 6, and (b) shows the output current-output voltage characteristics of the first power device 5. As shown in (c) of FIG. 5, upon receiving the instruction prescribing the magnitude I11 from the control unit 73, the second device 6 translates the line indicative of the output current-output voltage characteristics as indicated by an arrow in (c) of FIG. 5, thereby increasing the magnitude of the output current Io2 of the second device 6 from the magnitude I12 to the magnitude I11.

The second power device 6 has a configuration for monotonically decreasing the output voltage Vo2 with an increase of the output current Io2. This configuration can be implemented by slight modification to the configuration of the first power device 5 only with exception of few additional parts.

The next explanation is made to the monitoring device 7 shown in FIG. 1. In the following explanation, the optimal current magnitude Im is defined as the magnitude of the output current Io1 of the first power device 5 operating with its maximum power-conversion efficiency. In other words, the optimal current magnitude Im is defined as a magnitude of a current (the output current Io1) which is outputted to the DC supply line Wdc from the first power device 5 operating with its maximum power-conversion efficiency. For example, the conversion efficiency of the first power device 5 is defined as a proportion (=POUT/PIN) of power POUT to power PIN. The power POUT is defined as power supplied from the first power device 5 to the DC supply line Wdc. The power PIN is defined as power supplied from the commercial power source AC to the first power device 5.

In the present embodiment, the control unit 73 is configured to, upon acknowledging that the judgment unit 72 determines that the measurement (the magnitude of the load current $I_L$) exceeds the optimal current magnitude Im, send the instruction to the second power device 6 such that the current (=Ioa+Iob+Ioc) supplied from the second power unit to the DC power line Wdc is identical to the difference between the measurement and the optimal current magnitude Im.

In brief, upon acknowledging that the magnitude of the load current $I_L$ measured by the load current meter 70 exceeds the optimal current magnitude Im, the control unit 73 of the monitoring device 7 translates (shifts) the line indicative of the output current-output voltage characteristics by use of the adjusting means 64 (see FIG. 4) of each second power device 6 such that the output current Io1 of the first power device 5 has the same magnitude as the optimal current magnitude Im (i.e., the sum of the output currents Io2 respectively outputted from the second power devices 6 having their output voltages Vo2 equal to the output voltage Vo1 of the first power device 5 has the same magnitude as the difference between the magnitude of the load current $I_L$ and the optimal current magnitude Im).

By contrast, upon acknowledging that the measurement I0 falls below the optimal current magnitude Im, the control unit 73 controls the second power unit 8 to terminate supplying the current to the DC supply line Wdc. For example, upon acknowledging that the measurement I0 falls below the optimal current magnitude Im, the control unit 73 sends an output termination signal to each second power device 6 of the second power unit 8. The second power device 6 is configured to, upon receiving the output termination signal, terminate supplying the output current Io2.

Figure 8:
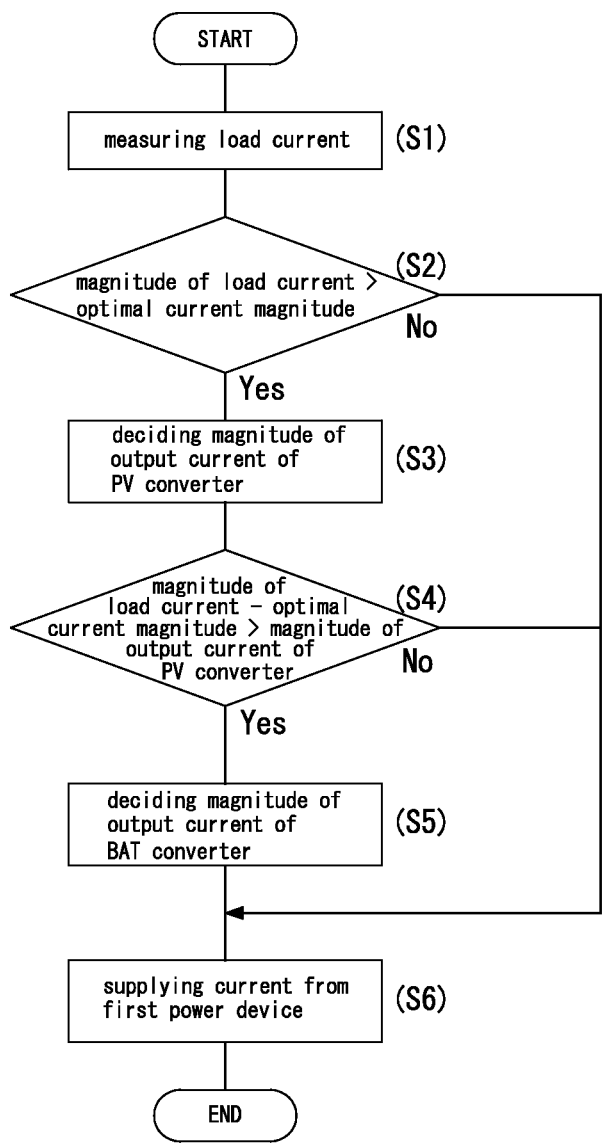
FIG. 8 is a flowchart illustrating an operation of the above power supply apparatus.
Figure 9:
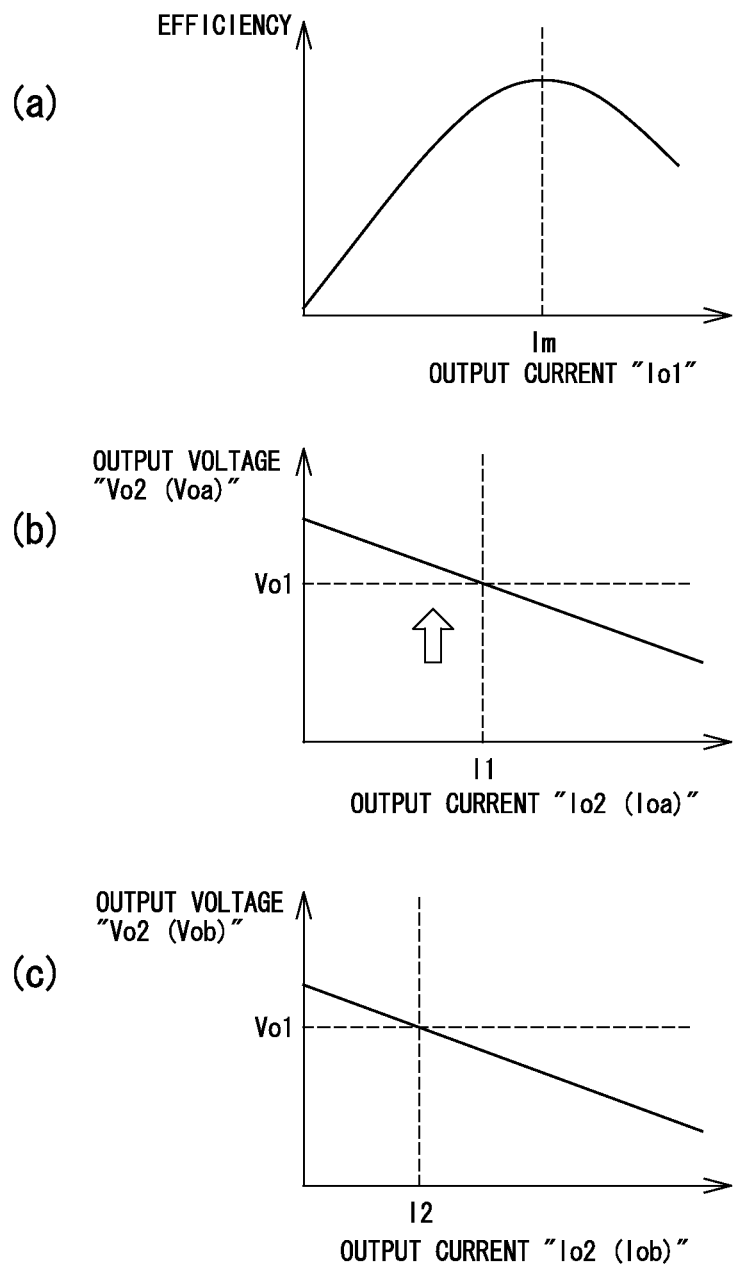
FIG. 9 shows a diagram (a) illustrating the output current-output voltage characteristics of the first power device of the above power supply apparatus, a diagram (b) illustrating output current-output voltage characteristics of the PV converter of the above power supply apparatus, and a diagram (c) illustrating output current-output voltage characteristics of the BAT converter of the above power supply apparatus.

Next, an explanation referring FIGS. 8 and 9 is made to an operation of the power supply apparatus 3 in accordance with the present embodiment.

First, the load current meter 70 measures the magnitude I0 of the load current $I_L$ (51 in FIG. 8). Next, the judgment unit 72 judges whether or not the magnitude I0 of the load current $I_L$ is greater than the optimal current magnitude Im (S2). When the magnitude I0 is greater than the optimal current magnitude Im, the control unit 73 sends, to the PV converter 6a, the instruction such that the magnitude of the output current Ioa of the PV converter 6a is identical to the difference between the magnitude I0 and the optimal current magnitude Im within the available power range of the solar cell 161. (S3). Upon receiving the instruction from the control unit 73, the PV converter 6a controls its adjusting means 64 to make the translation movement of the line indicative of the output current-output voltage characteristics of the PV converter 6a, thereby supplying the output current Ioa having its magnitude identical to the difference (=I0−Im) to the DC device 102.

As shown in (b) of FIG. 9, when the maximum magnitude I1 of the output current Ioa of the PV converter 6a is less than the difference (=I0−Im) (i.e., I0−Im>I1) (S4), the control unit 73 sends the instruction to the BAT converter 6b such that the output current Iob of the BAT converter 6b has the magnitude I2(I2=I0−Im−I1) (S5). Upon receiving the instruction from the control unit 73, the BAT converter 6b controls its adjusting means 64 to make the translation movement of the line indicative of the output current-output voltage characteristics of the BAT converter 6b, thereby supplying the output current Iob having the magnitude I2 to the DC device 102 as shown in (c) of FIG. 9.

According to the steps S3 to S5, the PV converter 6a is used for compensating for the difference (=I0−Im) prior to the BAT converter 6b. Therefore, it is possible to promote energy conservation.

A next explanation is made to an alternative example of the steps S4 and S5. Upon receiving the difference (=I0−Im), the control unit 73 may make instant judgment on the basis of calculation. That is, the control unit 73 judges whether or not the maximum magnitude I1 of the output current Ioa supplied from the PV converter 6a at the present insolation condition is less than the difference. Upon acknowledging that the maximum magnitude I1 is less than the difference, the control unit 73 calculates the current magnitude I2 defining the magnitude of the output current Iob of the BAT converter 6b. Then, the control unit 73 sends the instruction to the PV converter 6a such that the PV converter 6a supplies the output current Ioa of the maximum magnitude I1 as well as sends the instruction to the BAT converter 6b such that the BAT converter 6b supplies the output current Iob of the magnitude I2.

Thereafter, the first power device 5 supplies the output current Io1 of the optimal current magnitude Im to the DC device 102 (S6). The first power device 5 compensates for a shortage until the current having the total magnitude I0 is supplied after the PV converter 6a and the BAT converter 6c varies their output currents Ioa and Iob. Therefore, power is successfully supplied to the load (the DC device 102).

With regard to the step S2, when the magnitude I0 of the load current $I_L$ is not greater than the optimal current magnitude Im, the control unit 73 controls each second power device 6 such that each power device 6 terminates supplying power. Thus, the first power device 5 supplies the output current Io1 of the magnitude I0 to the DC device 102 (S6).

With regard to the step S4, when the difference current (the load current minus the current having the optimal current magnitude) has the same magnitude as the output current Ioa of the PV converter 6a, the control unit 73 deactivates the second power devices (the BAT converter 6b and the FC converter 6c) other than the PV converter 6a. Consequently, the first power device 5 supplies the output current Io1 of the optimal current magnitude Im to the DC device 102 (S6). In this situation, the control unit 73 transmits the instruction to the second power device 6a and sends the output termination signal to the remaining second power devices 6b and 6c.

The power supply apparatus 3 of the present embodiment performs the aforementioned operation. Therefore, in response to an increase of the load current $I_L$, the power supply apparatus 3 increases a total magnitude of the output currents Ioa and Iob of the PV and BAT converters 6a and 6b by an extent of the increase of the load current $I_L$. Further, in response to a decrease of the load current $I_L$, the power supply apparatus 3 decreases the total magnitude of the output currents Ioa and Iob of the PV and BAT converters 6a and 6b by an extent of the decrease of the load current $I_L$. When decreasing the total magnitude of the output currents Ioa and Iob of the PV and BAT converters 6a and 6b, the power supply apparatus 3 may decrease the output current Iob of the BAT converter 6b prior to the output current Ioa of the PV converter 6a.

The power supply apparatus 3 may be configured to perform the operations respectively defined by the steps S1 to S6 regularly (at a predetermined time interval). With this arrangement, it is possible to adjust the output current Io2 in response to a variation of a supply capacity of the cell (161, 162, 163) or the magnitude of the load current $I_L$. Besides, the predetermined time interval may be a time interval (e.g., a few milliseconds) enough to enable the load-following operation. In addition, the power supply apparatus 3 may perform the operations respectively defined by the steps S1 to S6 irrespective of the predetermined time interval.

The power supply apparatus 3 of the present embodiment includes the commercial power source dedicated power device (the first power device) 5, the one or more other power devices (the second power devices) 6, the load current measuring means (the load current meter) 70, and the controlling means (the control unit) 73. The commercial power source dedicated power device (the first power device) 5 is configured to receive power from the commercial power source AC and provide the output voltage Vo1 of a DC voltage which is a constant voltage irrespective of the magnitude of the output current Io1. The other power device 6 is configured to receive power and provide the output voltage Vo2 of a DC voltage which is monotonically decreased with an increase of the output current Io2. The other power device 6 is operated simultaneously with the first power device 5, thereby supplying DC power to the load device 102. The load current meter 70 is configured to measure the magnitude of the load current $I_L$ supplied to the load device 102. The controlling means 73 is configured to adjust the magnitude of the output current Io2 of the second power device 6. An optimal current magnitude Im is defined as the magnitude of the output current Io1 of the first power device 5 operating at the maximum conversion efficiency thereof. The second power device 6 includes the adjusting means 64 configured to translate the line indicative of the output current-output voltage characteristics defining the relation between the output current Io2 and the output voltage Vo2 during the power supply to the load device 102. Upon acknowledging that the magnitude of the load current $I_L$ measured by the load current meter 70 exceeds the optimal current magnitude Im, the control unit 73 shifts the line indicative of the output current-output voltage characteristics of each second power device 6 by use of the adjusting means 64 such that the total magnitude of the output currents Io2 of the second devices 6 is identical to the difference between the magnitude of the load current $I_L$ and the optimal current magnitude Im.

In other words, the power supply apparatus of the present embodiment includes the first power device 5, the second power unit 8, the load current measuring means (load current meter) 70, the judging means (judgment unit) 72, and the controlling means (control unit) 73. Each of the first power device 5 and the second power unit 8 is adapted to be connected to the DC supply line Wdc to be connected to the load device 102 and is configured to supply DC power to the load device 102 through the DC supply line Wdc. The load current measuring means 70 is configured to measure the current (load current) $I_L$ flowing through the DC supply line Wdc and output the measurement I0 indicative of the magnitude (current magnitude) I0 of the measured current (load current) $I_L$. The judging means 72 is configured to, upon obtaining the measurement I0 from the load current measuring means 70, judge whether or not the obtained measurement I0 exceeds the optimal current magnitude Im. The first power device 5 is adapted to be connected to the commercial power source AC. The first power device 5 is configured to convert power obtained from the commercial power source AC to the DC power so as to perform the constant voltage control of supplying the constant voltage (output voltage) Vo1 to the DC supply line Wdc irrespective of the current (output current) Io1 supplied therefrom to the DC supply line Wdc. The optimal current magnitude Im is defined as the magnitude of the current (output current) Io1 which is outputted to the DC supply line Wdc from the first power device 5 operating the maximum power-conversion efficiency thereof. The second power unit 8 includes at least one of the second power devices 6. The second power device 6 is configured to perform the inclination control of monotonically decreasing the output voltage Vo1 supplied therefrom to the DC supply line Wdc with an increase of the output current Io2 supplied therefrom to the DC supply line Wdc, and of monotonically increasing the output voltage Vo2 with a decrease of the output current Io2. The controlling means is configured to, upon acknowledging that the judging means 72 determines that the measurement I0 exceeds the optimal current magnitude Im, send the instruction to the second power device 6 such that the magnitude of the current supplied from the second power unit 8 to the DC power line Wdc is identical to the difference (the magnitude of the difference current) between the measurement I0 and the optimal current magnitude Im. The second power device 6 includes the adjusting means 64 configured to adjust the output current Io2 on the basis of the instruction received from the controlling means 73. The adjusting means 64 is configured to, upon receiving the instruction from the controlling means 73, modify the condition of the inclination control so as to adjust the output current Io2 to the current corresponding to the instruction without varying the output voltage Vo2.

As described in the above, upon acknowledging that the load current $I_L$ has its magnitude greater than the magnitude (optimal current magnitude Im) of the output current Io1 supplied from the first power device 5 connected to the commercial power source AC and operating at the maximum conversion efficiency, the apparatus of the present embodiment adjusts the magnitude of the output current Io2 of each power device 6 such that the output current Io1 of the first power device 5 has the same magnitude as the optimal current magnitude Im. Consequently, it is possible to operate the first power device at the maximum conversion efficiency.

Further, upon acknowledging that the magnitude of the load current $I_L$ measured by the load current meter 70 is not greater than the optimal current magnitude Im, the control unit 73 controls the second power unit 6 so as to terminate supplying the current. In other words, the control unit 73 is configured to, upon acknowledging that the judgment unit 72 determines that the measurement I0 does not exceed the optimal current magnitude Im, control the second power unit 8 so as to terminate supplying the current to the DC supply line Wdc.

Accordingly, the present embodiment can operate the first power device 5 at a condition as close to the maximum conversion efficiency as possible, even when the magnitude of the load current $I_L$ is less than the optimal current magnitude Im.

Besides, in the present embodiment, when the magnitude of the load current $I_L$ is greater than the optimal current magnitude Im, the PV converter 6a and the BAT converter 6b cooperate to compensate for the difference current (the load current minus the current having the optimal current magnitude). Alternatively, instead of a combination of the PV converter 6a and the BAT converter 6b, the PV converter 6a and the FC converter 6c may cooperate to compensate for the difference current, or the BAT converter 6b and the FC converter 6c may cooperate to compensate for the difference current.

The invention claimed is:

1. Power supply apparatus comprising:
a first power device and a second power unit each adapted to be connected to a DC supply line to be connected to a load device and configured to supply DC power to said load device through the DC supply line;
load current measuring means configured to measure a current flowing through the DC supply line and output a measurement indicative of a magnitude of the measured current;
judging means configured to, upon obtaining the measurement from said load current measuring means, judge whether or not the obtained measurement exceeds an optimal current magnitude; and
controlling means,
wherein said first power device is adapted to be connected to a commercial power source, and is configured to convert power obtained from the commercial power source to the DC power so as to perform constant voltage control of supplying a constant voltage to the DC supply line irrespective of a current supplied therefrom to the DC supply line,
the optimal current magnitude being defined as a magnitude of a current which is outputted to the DC supply line from said first power device operating its maximum power-conversion efficiency,
said second power unit including at least one of second power devices,
said second power device being configured to perform inclination control of monotonically decreasing an output voltage supplied therefrom to the DC supply line with an increase of an output current supplied therefrom to the DC supply line, and of monotonically increasing the output voltage with a decrease of the output current,
said controlling means being configured to, upon acknowledging that said judging means determines that the measurement exceeds the optimal current magnitude, send an instruction to said second power device such that a magnitude of the current supplied from said second power unit to the DC power line is identical to a difference between the measurement and the optimal current magnitude,
said second power device including adjusting means configured to adjust the output current on the basis of the instruction received from said controlling means, and
said adjusting means being configured to, upon receiving the instruction from said controlling means, modify a condition of the inclination control so as to adjust the output current to a current corresponding to the instruction without varying the output voltage.

2. Power supply apparatus as set forth in claim 1, wherein said controlling means is configured to, upon acknowledging that said judging means determines that the measurement does not exceed the optimal current magnitude, control said second power unit so as to terminate supplying the current to the DC supply line.

3. Power supply apparatus as set forth in claim 1, wherein said second power unit includes a plurality of said second power devices, the current supplied to said DC supply line from said second power unit being defined as the sum of the output currents respectively supplied from said second power devices.

4. Power supply apparatus comprising:
a first power device connected to the DC supply line for supply DC power to a load device through the DC supply line;
a second power unit connected to the DC supply line for supply DC power to the load device through the DC supply line;
a load current measuring circuit for measuring a current flowing through the DC supply line and output a measurement indicative of a magnitude of the measured current;
a judging circuit for determining whether or not the obtained measurement exceeds an optimal current magnitude upon obtaining the measurement from said load current measuring circuit; and
a controlling circuit connected to the second power unit,
wherein said first power device is adapted to be connected to a commercial power source, and is configured to convert power obtained from the commercial power source to the DC power so as to perform constant voltage control of supplying a constant voltage to the DC supply line irrespective of a current supplied therefrom to the DC supply line, the optimal current magnitude being defined as a magnitude of a current which is outputted to the DC supply line from said first power device operating its maximum power-conversion efficiency, said second power unit including at least one of second power devices, said second power device being configured to perform inclination control of monotonically decreasing an output voltage supplied therefrom to the DC supply line with an increase of an output current supplied therefrom to the DC supply line, and of monotonically increasing the output voltage with a decrease of the output current, said controlling circuit being configured to, upon acknowledging that said judging circuit determines that the measurement exceeds the optimal current magnitude, send an instruction to said second power device such that a magnitude of the current supplied from said second power unit to the DC power line is identical to a difference between the measurement and the optimal current magnitude, said second power device including an adjusting circuit configured to adjust the output current on the basis of the instruction received from said controlling circuit, and said adjusting circuit being configured to, upon receiving the instruction from said controlling circuit, modify a condition of the inclination control so as to adjust the output current to a current corresponding to the instruction without varying the output voltage.

* * * * *